United States Patent [19]

Kobelt

[11] 4,236,608
[45] Dec. 2, 1980

[54] COMPACT CALIPER BRAKE

[76] Inventor: Jacob Kobelt, 6110 Oak St., Vancouver, British Columbia, Canada, V6M 2W2

[21] Appl. No.: 955,963

[22] Filed: Oct. 30, 1978

[51] Int. Cl.³ .............................................. B61H 7/12
[52] U.S. Cl. ...................................... 188/43; 188/72.6
[58] Field of Search ................................... 188/41–45, 188/72.9, 72.6, 59

[56] References Cited

U.S. PATENT DOCUMENTS

| | | | |
|---|---|---|---|
| 3,109,517 | 11/1963 | Butler et al. | 188/59 X |
| 3,972,392 | 8/1976 | Johnson | 188/43 |
| 3,986,584 | 10/1976 | Wright et al. | 188/72.9 X |

*Primary Examiner*—Douglas C. Butler
*Attorney, Agent, or Firm*—Carver and Company

[57] ABSTRACT

Caliper brake particularly for installation in locations where there is insufficient space for conventional caliper brakes of similar capacity, and also adapted to accommodate lateral shifting of the brake shoes due to deviating braking surfaces. Brake has a pair of caliper arms with brake shoes at outer ends thereof, and actuator with axis of extension and retraction disposed longitudinally of the caliper arms. A toggle structure cooperates with the actuator and caliper arms to force inner ends of arms apart when the actuator is actuated, and includes toggle links having inner ends hinged to actuator and outer ends hinged to inner ends of respective caliper arms. To permit the brake shoes to move laterally, the caliper arms are hinged on a mounting structure which cooperates with frame to permit relative swinging between mounting structure and actuator.

13 Claims, 8 Drawing Figures

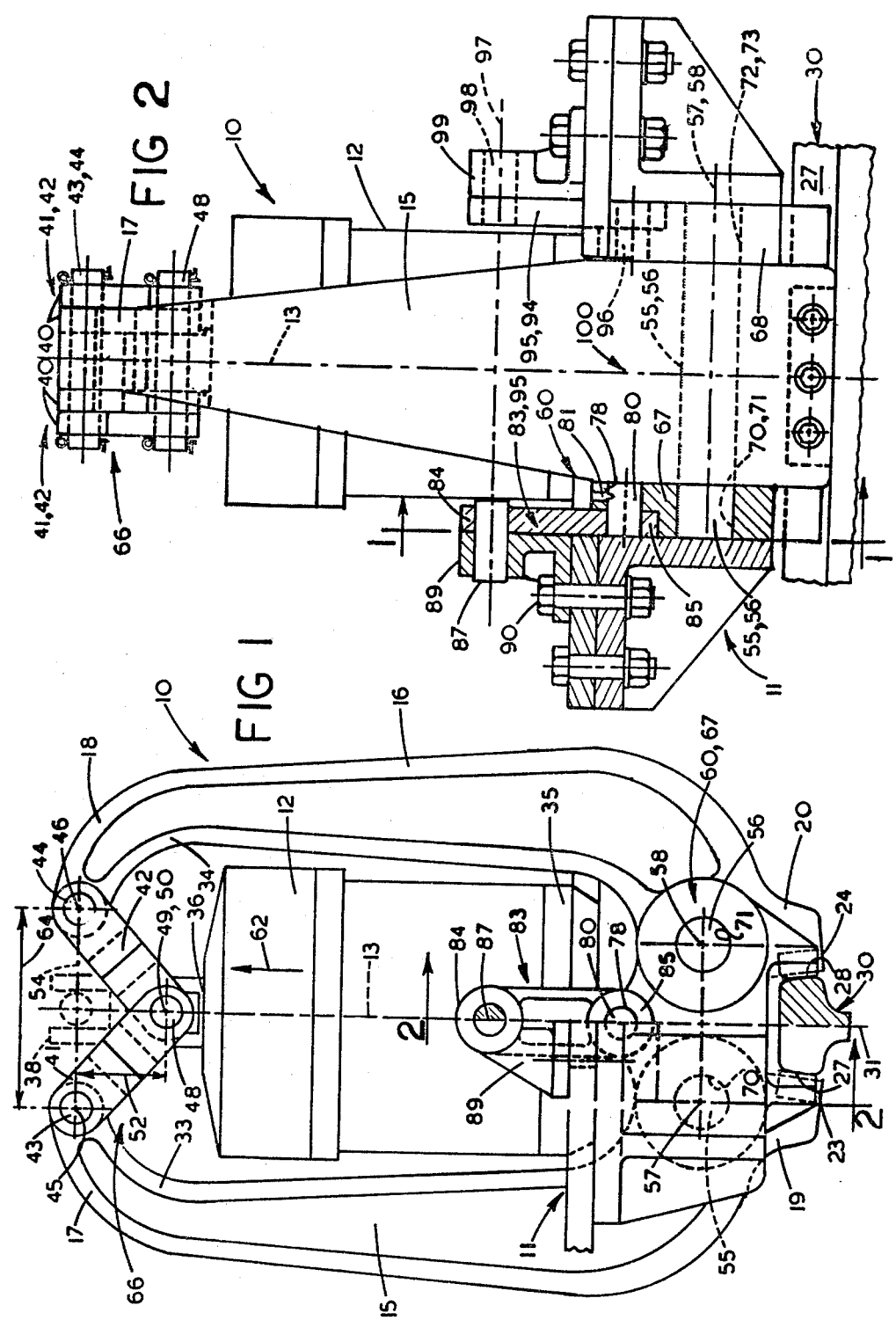

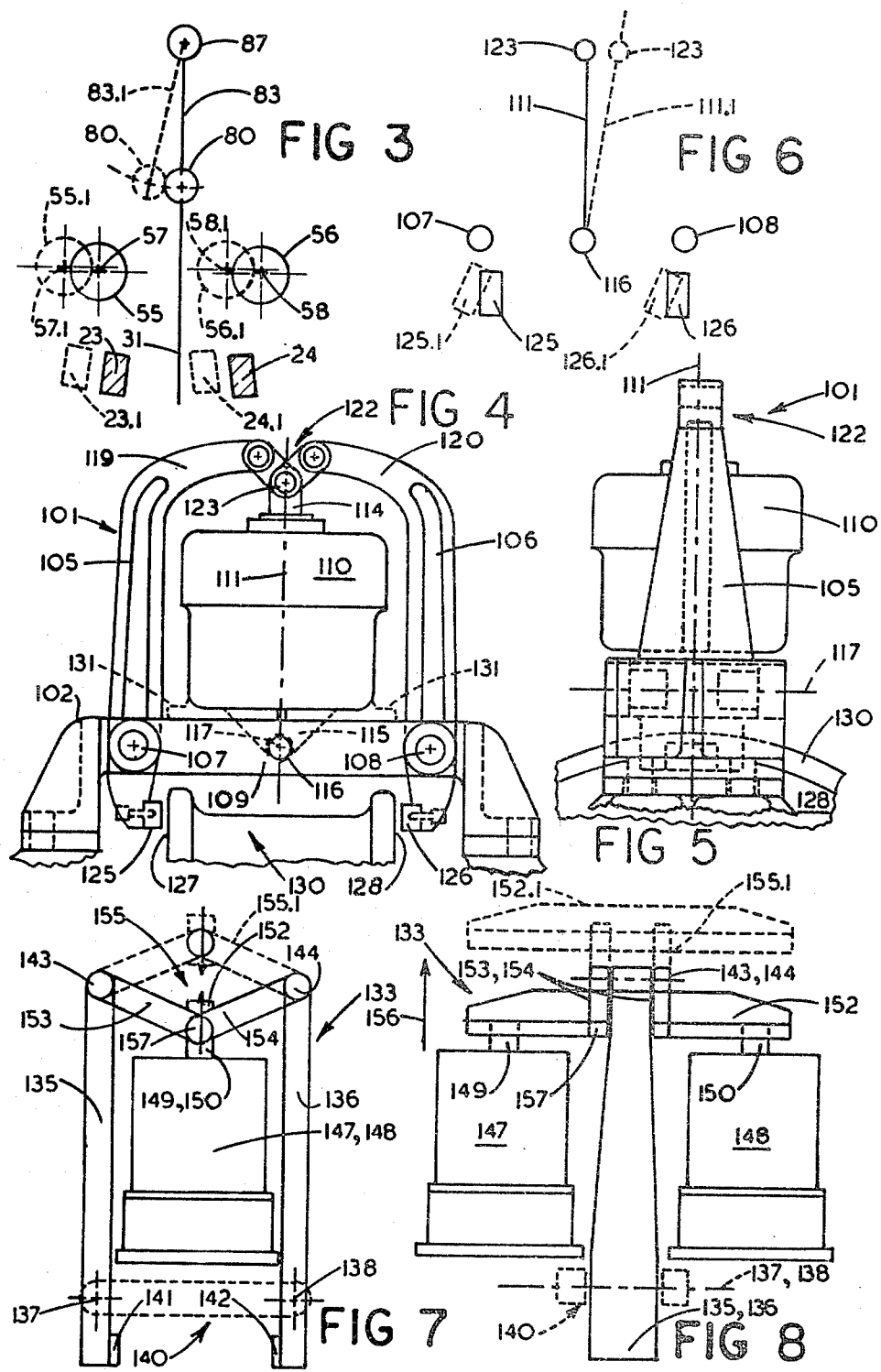

COMPACT CALIPER BRAKE

BACKGROUND OF THE INVENTION

1. Field of the Invention

The invention relates to a caliper brake mechanism of compact design capable of generating high braking force, and can be particularly adapted to accomodate limited lateral movements of the surfaces to be braked.

2. Prior Art

Prior art brakes for providing large braking forces generally require relatively long caliper arms and large actuators to generate sufficient braking force, which arms require sufficient space to accomodate the correspondingly longer travel. Commonly this space is not easily provided and the design might be compromised with resulting marginal braking capacity.

Also, caliper brakes have been used for many years to brake discs which can be machined and journalled within relatively close tolerances so that, when the disc rotates, braking surfaces of the disc are maintained within reasonable limits of ideal or theoretical braking surface planes. When used with such discs, brake shoes of the calipers can be adjusted to a close spacing from the disc for improved braking performance. In some applications caliper brakes have also been used to brake or clamp on other items, for example as a rail clamp particularly for use with a mobile crane. In this application difficulties arise because rails carrying the crane usually cannot be held to such close dimensional limits as discs, and thus braking surfaces of the rails exhibit a considerable deviation from ideal braking surface planes. Consequently, a caliper brake that is adapted to clamp directly onto a rail must be able to accommodate lateral deviations of the braking surfaces otherwise one or both of the shoes likely will intermittently contact the rail thus causing premature shoe wear. Alternatively the brake shoes could be adapted for relatively long travel before contacting the braking surface so that when retracted the shoes are disposed so as not to interfere with the rail as the crane is traversed along the rails. If the caliper brake provides long travel of the shoes from a retracted position, usually considerable caliper arm movement is required and this requires considerable clearance or space adjacent the caliper brake unit, which space is not always available where required.

SUMMARY OF THE INVENTION

The invention reduces some of the difficulties and disadvantages of the prior art by providing a relatively compact caliper brake in which braking force available from a given volume occupied by the brake is greater than some prior art brakes occupying the same or greater volume. The caliper brake has an actuator disposed longitudinally of the caliper arms so as to produce a relatively compact unit and to provide an appreciable mechanical advantage for applying force to the arms without requiring excessively long arms or a large actuator. Furthermore, in some embodiments of the invention, means are provided to permit the brake shoes to accomodate lateral deviations of the braking surfaces.

A caliper brake assembly according to the invention has a frame, an extensible and retractable actuator connected to the frame and a pair of caliper arms hinged for rotation about respective hinge axes. The arms have outer ends adapted to carry brake shoes for forcing against braking surfaces disposed between the shoes. The brake assembly is further characterized by the actuator having an axis of extension and retraction disposed longitudinally of the caliper arms and within a plane passing between the hinge axes of the caliper arms, and toggle means cooperating with the actuator and the caliper arms to apply a force to the arms as the actuator is actuated. Swivel mounting means cooperate with the caliper arms or the actuator to permit relative swinging between the hinge axes of the caliper arms and the axis of the actuator about a swivel axis disposed parallel to the hinge axes of the caliper arms. This permits limited lateral swinging of the brake shoes to accommodate assymmetrical disposition of the braking surfaces. One embodiment of the invention has caliper arm mounting means journalling the caliper arms and cooperating with the frame to permit relative swinging between the mounting means and the actuator so the brake shoes can move laterally simultaneously in the same general direction to follow some lateral deviation of the braking surfaces. In one embodiment the actuator is secured to the frame and the caliper arm mounting means can swing as a unit relative to the frame. In another embodiment the mounting means is secured to the frame and the actuator cooperates with the frame to permit relative swinging therebetween.

A detailed disclosure following, related to the drawings, describes a preferred embodiment of the invention which is capable of expression in structure other than that particularly described and illustrated.

DESCRIPTION OF THE DRAWINGS

FIG. 1 is a simplified fragmented front elevation of the caliper brake assembly according to the invention cooperating with a rail, a portion being shown in section as would be seen generally from line 1—1 of FIG. 2, FIG. 2 is a simplified fragmented side elevation of the device of FIG. 1, a portion being shown in section as would be seen generally from line 2—2 of FIG. 1, FIG. 3 is a simplified diagram showing lateral movement of portions of the assembly of FIGS. 1 and 2, FIG. 4 is a simplified front elevation of an alternative caliper brake assembly according to the invention, FIG. 5 is a simplified side elevation of the caliper brake assembly of FIG. 4, FIG. 6 is a simplified diagram showing lateral movement of a portion of the brake assembly of FIGS. 4 and 5, FIG. 7 is a simplified diagrammatic front elevation of a second alternative embodiment using two actuators, FIG. 8 is a simplified diagrammatic side elevation of the alternative embodiment of FIG. 7.

DETAILED DISCLOSURE

FIGS. 1 and 2

A caliper brake assembly 10 according to the invention has a frame 11, and an extensible and retractable pneumatic actuator 12 with an axis of extension and retraction 13. The brake assembly 10 also has a pair of similar caliper arms 15 and 16 having inner ends 17 and 18 respectively and outer ends 19 and 20 respectively. The inner ends 17 and 18 cooperate with the actuator, as will be described, and the outer ends 19 and 20 carry brake shoes 23 and 24 respectively for forcing against braking surfaces 27 and 28 disposed on opposite sides of a rail 30 or equivalent structure to be braked. In this position, the actuator is defined as being disposed longitudinally of the caliper arms, ie. the axis 13 is disposed generally parallel to a major axis of the caliper arms. As best seen in FIG. 1, the rail is disposed between the shoes, and the braking surfaces are within parallel ideal or theoretical braking surface planes, not shown, disposed parallel to a plane containing a central rail axis 31, or within inclined braking planes as shown. The rail thus provides a pair of opposed braking surfaces for braking a mobile vehicle, such as a crane, and can also be used to support the vehicle in some applications. The rail is manufactured and installed within normal tolerances and it is likely that the braking surfaces would deviate from the ideal braking surface planes of the rail and, to avoid undesirable interference between the rail and the brake shoes, clearly sufficient clearance must be provided in the retracted position.

Inner ends 17 and 18 of the caliper arms 15 and 16 are curved inwardly at bends 33 and 34 respectively so as to partially enclose the actuator 12 as seen in FIG. 1. The actuator has an inner end 35 rigidly secured to the frame 20 and a piston rod having an outer end 36 which is reciprocable along the axis 13 and is shown at an inner position in full outline and at an outer position 38 in broken outline. First and second toggle link pairs 41 and 42 have outer toggle hinge pins 43 and 44 at outer ends thereof hinging the link pairs 41 and 42 to inner ends of the arms 15 and 16 respectively for rotation about outer hinge axes 45 and 46 respectively. The toggle link pairs have four similar toggle links 40 having inner ends hinged on an inner toggle hinge pin 48 carried at the piston rod outer end 36, and have coincident hinge axes 49 and 50 at inner ends thereof concentric with the hinge pin 48. Thus, the toggle links have inner ends hinged to the actuator, and outer ends hinged to the respective caliper arms. When the actuator is retracted as shown, the coincident hinge axes 49 and 50 at the inner ends of the toggle links are displaced laterally by a spacing 52 from a straight line 54 connecting the hinge axes 45 and 46 at the outer ends of the links.

The caliper arms 15 and 16 are hinged for rotation about respective caliper arm hinge pins 55 and 56 having caliper arm hinge axes 57 and 58 respectively, the pins being carried in a caliper arm mounting means 60 to be described in detail later. It can be seen that, when the actuator is actuated, the piston rod outer end 36 extends along the axis 13 in direction of an arrow 62, and the spacing 52 between the coincident hinge axes 49 and 50 at the inner ends of the links and the straight line 54 is decreased. This decrease in spacing forces apart inner ends of the caliper arms, thus increasing spacing 64 between the axes 45 and 46 so as to force the brake shoes 23 and 24 against the rail. It is noted that the axis of extension and retraction 13 of the actuator 12 is disposed within a plane passing between the hinge axes 57 and 58 of the caliper arms and that the assembly is symmetrical about this plane.

As the piston rod outer end 36 extends in direction of the arrow 62, an outward force is applied to the hinge pins 43 and 44, the magnitude of which force is dependent on the relative angles and changes of these angles between lines of action connecting the hinge axes with the axis of extension. By selecting toggle links of particular lengths to attain particular angles, it can be arranged so that as the actuator extends, the force applied to the hinges increases rapidly to a particular extension of the piston rod, beyond which further extension produces a relatively small increase, and then a decrease in force. There are several variables which can be changed to suit specific design requirements, which requirements are limited in most cases to available clearance between the brake shoes and the braking surfaces. Such clearance is necessary to avoid interference when there is relative movement between the rail and the caliper brake. From the above it can be seen that the toggle links 40 hinged to the actuator and respective inner ends of the caliper arms serve as a toggle means 66 cooperating with the actuator and the caliper arms to apply a force to the caliper arms as the actuator is actuated.

For close tolerance applications where the braking surfaces are held within close limits of braking surface planes, the brake shoes can be set relatively closely adjacent the surfaces and the actuator and the caliper arms cooperate directly with the frame as will be described with reference to FIGS. 4 and 5. However, for many applications close tolerance braking surfaces are not practicable and lateral variations of the braking surfaces must be accomodated. One aspect of the invention provides a means of reducing the necessary clearance between the brake shoes and braking surfaces by permitting the caliper arms as a unit to move simultaneously laterally in the same direction to accomodate lateral deviations of the braking surfaces relative to the caliper brake. Thus, by selecting minimum clearance necessary between the brake shoes, which in effect float together, the piston rod outer end can be adjusted to obtain desired mechanical advantage resulting from extension of the actuator and geometry of the toggle means 66. The invention thus provides a caliper arm mounting means cooperating with the frame and the caliper arms to permit the brake shoes to follow some lateral deviation of the braking surfaces. One structure which permits this lateral movement includes the mounting means 60 which is characterized by a pair of similar journal brackets 67 and 68 fitted on either side of the caliper arms to sandwich the caliper arms therebetween. The journal bracket 67 has a pair of spaced bores 70 and 71, and the bracket 63 has similar bores 72 and 73 which are aligned with the bores 70 and 71 to accept the caliper arm hinge pins 55 and 56 therein. The pins 55 and 56 pass through undesignated bores adjacent the outer ends 19 and 20 of the arms 15 and 16 respectively and thus each pin is supported at its opposite ends in the journal brackets. The journal brackets 67 and 68 thus sandwich the caliper arms therebetween and it can be seen that actuation of the actuator rotates the caliper arms about the respective hinge pins.

The journal bracket 67 has a central bore 78 spaced above and between the bores 70 and 71 and generally on the axis 13. The bore 78 accepts a link hinge pin 80 which is secured to the bracket 67 with a locking pin 81 to prevent rotation therebetween. A connecting link 83 has inner and outer ends 84 and 85, each end having respective undesignated bores, the bore at the outer end 85 accepting the link hinge pin 80, and the bore at the inner end accepting a swivel pin 87 extending from a swivel bracket 89 secured to the frame 11 by nut and bolt means 90. As best seen in FIG. 2, a similar connecting link 94 is fitted on an opposite side of the caliper arms and is similarly connected at an outer end thereof to the journal bracket 68 by a link hinge pin 96. The link 94 has an inner end connected to the frame by a swivel pin 98 carried in a swivel bracket 99 similar to the pin 87 and the bracket 89. It can be seen that the caliper arms are thus journalled on a pair of spaced journal brackets which permit the arms to move relative to each other about the caliper arm hinge pins, and simultaneously permits swinging of the caliper arms and the associated hinge pins as a unit about a swivel axis 97 concentric with the swivel pins 87 and 98 and disposed between the toggle means and the caliper arm hinge axes. Thus, as will be apparent from FIG. 3, when swinging, the journal brackets describe a small arc about the swivel axis 97 which results in general lateral movement of the arm journalling means with the arms. The bores in the journal brackets and the associated hinge pins thus serve as spaced journals to journal the caliper arms, the spaced journals having axes parallel to the swivel axis 97.

Thus, it can be seen that the caliper arm mounting means 60 is characterized by the journal brackets 67 and 68 and associated caliper arm hinge pins which are termed arm journalling means 100, which journal the caliper arms for pincer movement relative to each other. The means 60 also includes connecting means 95, namely the connecting links 83 and 94 and associated hinge pins, which cooperate with the frame and the arm journalling means to permit generally lateral movement of the arm journalling means. The connecting means 95 is thus characterized by connecting link means having inner and outer ends, the inner end being journalled on the frame to permit rotation of the link means about the swivel axis disposed generally parallel to the braking surface, and the outer end cooperating with the arm journalling means.

OPERATION

Referring to FIG. 1, it can be seen that as the outer end 36 of the piston rod moves from the retracted position, in full outline, to the extended position 38, in broken outline, an outwardly directed force is applied, through the toggle means 66, to the caliper arm inner ends 17 and 18. This force increases rapidly at first as angles of the toggle links change, and then the force decreases as the toggle links become aligned with each other. As previously described, by selecting curvature and length of the arms 15 and 16, which determines relative locations of the hinge axes 45, 46, 49 and 50, a particular braking force between the brake shoes can be attained.

The brake assembly is particularly adapted to accomodate a situation where the rail axis 31 or equivalent, ie. mid position of the braking surfaces, is displaced laterally from the brake or actuator axis 13. This produces assymmetrically disposed braking surfaces relative to the brake assembly. The assembly 10 of FIG. 1 is particularly adapted to accomodate such assymmetry by limited lateral movement of the brake shoes by swinging sideways in response to interference of one braking surface with a particular adjacent shoe. If the caliper brake was traversing the rail in an inoperative condition, as in a mobile crane brake, it can be appreciated that caliper arm mounting means would permit the journalling means to swing about the swivel axis 97 to accomodate lateral deviations of the rail. This could arise from light contact on one side of the rail with the adjacent brake shoe, and the journal brackets would swing over relieving the brake shoe of excessive force which would otherwise tend to wear the brake shoe prematurely.

FIG. 3

Light or heavy contact between assymmetrically disposed brake surfaces, and the brake shoes is now discussed in detail. The major hinge pins 55, 56 and 80, a central axis of the link 83 and the brake shoes 23 and 24 of assembly 10 are shown schematically in full outline in a symmetrical position, and in broken outline at 55.1, 56.1, 80.1, 83.1, 23.1 and 24.1 in a laterally displaced position (shown exaggerated), due to the assymmetrical disposition of braking surface, not shown. The caliper arm hinge axes 57 and 58 are thus displaced to positions 57.1 and 58.1 and it can be seen that, for a small angular movement of the link 83, the faces of the brake shoes in the displaced positions 23.1 and 24.1, broken outline, are generally parallel to the faces of the shoes in the symmetrical position 23 and 24, full outline, which of course would be parallel to the braking surfaces. Thus, it can be seen that the mounting means 60 moves generally as a parallelogram, and, with small lateral movement of the brake shoes, wear of the brake shoes is likely to be generally even, that is, wear of the brake shoe adjacent an inner edge of the shoe will likely be generally equal to wear adjacent an outer edge of the shoe. Thus, the brake shoes tend to wear equally across their width due to parallelogram-like linkage of the brake assembly.

ALTERNATIVES AND EQUIVALENTS

The inner ends of toggle links 40 are shown hinged on the single toggle hinge pin 48 carried on the actuator piston rod so that hinge axes 49 and 50 of the toggle links are coincident. In an alternative, the inner ends can be journalled on two separate, laterally spaced hinge pins, not shown, with non-coincident hinge axes which permits greater variation of lengths and angles of the toggle links. Also one piece toggle links can be substituted for the pairs of links as illustrated.

Also the actuator is shown positioned axially between the caliper arms on the same side of the toggle means as the caliper arm hinge pins. In some applications, to utilize the mechanical advantage of the toggle means, it may be desirable to mount the actuator on a side of the toggle means remote from the caliper arm hinge pins, whilst the actuator axis is still disposed longitudinally of the caliper arms. Or alternatively, the toggle means can be positioned on an opposite side of the line 54 so that retraction of the actuator applies the brake. In the above alternatives, and those to be described, the axis 13 of the actuator is disposed normally to the hinge axes of 57 and 58 when viewed generally normally to the braking surfaces, ie. as would appear in the side elevation of FIG. 2.

FIGS. 4 and 5

An alternative caliper brake assembly 101 has a frame 102 and a pair of similar caliper arms 105 and 106 journalled for rotation on caliper arm hinge pins 107 and 108 carried on a caliper arm mounting means 109 secured rigidly to the frame. An actuator 110 has an axis of extension and retraction 111, and a piston rod having an outer end 114 adapted to reciprocate along the axis. The actuator has an inner end 115 mounted on an actuator hinge pin 116 mounted in the caliper arm mounting means 109 which, as the means 109 is secured to the frame, results in the actuator effectively being hinged to the frame. The hinge pin 116 serves as an actuator journalling means having an actuator hinge axis 117 disposed parallel to axes of the caliper arms and normally to and intersecting the axis of extension and retraction 111. Thus the axis 117 is also coplanar with a hinge axis plane containing axes of the hinge pins 107 and 108, but, if desired the axis 117 can be disposed outside the hinge axis plane. The caliper arms 105 and 106 have inwardly curved inner ends 119 and 120 extending towards the actuator and a toggle means 122, generally similar to the toggle means 66 of FIGS. 1 through 3, cooperates with a toggle hinge pin 123 on the actuator and hinge pins on the caliper arms to provide the mechanical advantage previously described. The caliper arms have outer ends carrying brake shoes 125 and 126 respectively which, when the caliper assembly is symmetrical, have braking faces spaced equally from braking surfaces 127 and 128 of a braking element 130 which can be a disc or rail.

The frame thus cooperates with the actuator journalling means to permit swinging of the actuator relative to the frame. However, there is a distinct difference is movement between the brake shoes of the two different caliper brake assemblies, as will be described with reference to FIG. 6, and this contrasts with the movement shown in the diagram of FIG. 3. In either structure, the actuator effectively cooperates with the toggle means 66 to permit relative swinging therebetween for at least partial self adjustment of the brake shoes.

FIG. 6

The actuator axis 111, the hinge pins 107, 108, 116 and 123 and the brake shoes 125 and 126 of the assembly 101 of FIGS. 4 and 5 are shown in full outline in the symmetrical position. The axis 111, the hinge pin 123 and brake shoes are shown in broken outline at 111.1, 123.1, 125.1 and 126.1 in exaggerated displaced positions in which the brake shoes have been displaced from the symmetrical position of FIG. 4 by braking surfaces, not shown. In the displaced position for a small lateral movement, oppositely facing surfaces of the brake shoes are seen to be maintained almost parallel to each other but they are no longer parallel to the faces of the shoes in the symmetrical position, ie. parallel to the braking surfaces. Thus, it can be seen that, when braking in the displaced position of the brake shoes, one of the brake shoes would tend to wear excessively at one edge, and the remaining brake shoe would tend to wear excessively at the other edge. If the braking element, ie. the rail or disc, has extreme displaced portions that are displaced generally equally on each side of a central plane of the braking element, the excessive wear adjacent edges of the brake shoes will tend to be equalized between the shoes and would likely result in generally rounded faces of the brake shoes.

The diagrams of FIGS. 3 and 6 illustrate, in an exaggerated manner, lateral shifting of the brake shoes as a single unit resulting from relative lateral deviation of the braking surfaces from the ideal braking planes. Clearly there are limits to degrees of displacements acceptable to a caliper brake assembly and, in general, the assembly 10 of FIGS. 1 through 3 can tolerate a greater deviation of braking surfaces whilst maintaining acceptable brake shoe wear when compared with prior art brake shoes in a similar situation. The assembly 101 of FIGS. 4 and 5 is mechanically simpler than the assembly 10 but, other factors being equal, for acceptable brake shoe wear the assembly 101 can accomodate less deviation of the braking surfaces than the assembly 10. It is considered that both arrangements are superior to the conventional non-aligning caliper brake arrangement both in braking force available for a particular volume of brake assembly and also in capacity to align with assymmetrically disposed braking surfaces.

Thus, in summary, it can be seen that the swinging caliper arm hinge axes 60 in combination with the rigidly mounted actuator 12 of FIGS. 1 through 3, and the rigidly mounted caliper arm hinge axes with the hinged actuator 110 of FIGS. 4 and 5, both serve as swivel mounting means cooperating with the caliper arms or the actuator to permit relative swinging between the hinge axes of the caliper arm and the axis of the actuator about a swivel axis disposed parallel to the hinge axes of the caliper arms. In FIGS. 1 through 3, the swivel axis is the axis 97 and in FIGS. 4 through 6, the swivel axis is the hinge axis 117. Both embodiments permit limited lateral shifting of the brake shoes to accommodate asymmetrical disposition of the braking surfaces.

Yet another alternative, shown diagrammatically in broken line in FIG. 4, combines portions from the assemblies 10 and 101 for simplicity, but does not have the ability to self align the brake shoes appreciably with non-symmetrical braking surfaces. The caliper arms are journalled on a caliper arm mounting means secured rigidly to the frame similarly to the means 109 of FIGS. 4 and 5, and the actuator has cylinder mounting lugs 131, shown in broken outline, to secure the actuator rigidly to the frame similarly to the actuator 12 of FIGS. 1 and 2. This alternative has the toggle means as previously described to attain the mechanical advantage of the invention, but, of course, does not have self aligning brake shoes.

FIGS. 7 and 8

A second significant alternative brake assembly 133 has a pair of caliper arms 135 and 136 journalled on caliper hinge pins, not shown, having respective hinge axes 137 and 138. The hinge pins are mounted in caliper arm mounting means 140, shown simplified in broken outline, which can be similar to the mounting means 60 of FIG. 1, to permit lateral movement of the hinge pins, or the rigid mounting means 109 of FIG. 4. The arms 135 and 136 have outer ends carrying brake shoes 141 and 142 respectively and inner ends carrying outer toggle hinge pins 143 and 144, the inner ends being straight in contrast with the previously described embodiments. First and second actuators 147 and 148 cooperate with a frame of the caliper brake assembly, not shown, and have piston rod outer ends 149 and 150 coupled together by a connecting yoke 152 extending between the actuators and passing between the caliper arms. Toggle link pairs 153 and 154 extend between the hinge pins 143 and 144 at inner ends of the caliper arms and a toggle hinge pin 157 adjacent a central portion of the connecting yoke 152 to serve as toggle means 155. The actuators can be rigidly secured to, or hinged to, the frame, depending on the mounting means 140 and self aligning requirements.

In operation, simultaneous extension of the actuators moves the yoke 152 in direction of an arrow 156 which applies a force to the toggle link pairs, forcing the brake shoes towards each other to actuate the brake. Thus it can be seen that the actuators have axes of extension and retraction disposed longitudinally of the caliper arms, and the toggle means 155 cooperate with the actuators and the caliper arms in a manner equivalent to the previously described embodiments. Clearly additional force can be applied to the caliper arms by providing a second actuator coupled in parallel with the first actuator as shown, and, because the caliper arms are fitted between the two spaced actuators, diameters of the actuators are not critical and, if desired, two actuators having diameters greater than space between the caliper arms can be used to attain even higher forces. As in the previously described examples, the connecting yoke 152 and the toggle means 155 can be fitted in the broken outline position 152.1 and 155.1 respectively such that retraction of the actuator applies the brake. It can be seen that this structure also has equivalent swivel mounting means cooperating with the caliper arms or the actuators to permit relative swinging between the hinge axes of the caliper arms and the axes of the actuators as disclosed in the two previous embodiments.

I claim:

1. A caliper brake assembly having: a frame; a pair of caliper arms hinged for rotation about respective hinge axes and having outer ends adapted to carry brake shoes for forcing against braking surfaces disposed between the shoes; an extensible and retractable actuator connected to the frame and having an axis of extension and retraction disposed longitudinally of the caliper arms and within a plane passing between hinge axes of the caliper arms; toggle means cooperating with the actuator and the caliper arms to apply a force to the caliper arms as the actuator is actuated; the brake assembly being further characterized by:
    (a) swivel mounting means cooperating with the caliper arms or the actuator to permit relative swinging between the hinge axes of the caliper arms and the axis of the actuator about a swivel axis disposed parallel to the hinge axes of the caliper arms,
so as to permit limited lateral shifting of the brake shoes to accommodate asymmetrical disposition of the braking surfaces.

2. A caliper brake assembly as claimed in claim 1 in which the toggle means is characterized by:
    (a) a pair of toggle links having inner ends hinged to the actuator and outer ends hinged to the respective caliper arms.

3. A caliper brake assembly as claimed in claim 2 further characterized by:
    (a) the toggle links having hinge axes at inner and outer ends thereof, the hinge axes at the inner ends being displaced laterally from a straight line connecting the hinge axes at the outer ends,
so that when the actuator is actuated, distance between the hinge axes at the inner ends of the links and the straight line is decreased, thus forcing apart inner ends of the caliper arms.

4. A caliper brake assembly as claimed in claim 1 further characterized by:
    (a) the caliper arms having inner ends curved inwardly towards each other,
    (b) the actuator cooperates with the toggle means to permit relative swinging therebetween and is positioned between the caliper arms.

5. A caliper brake assembly as claimed in claim 1 further characterized by:
    (a) the caliper arms being hinged on the frame for rotation relative thereto, and the swivel mounting means is characterized by:
    (b) the actuator being hinged directly to the frame for rotation about an actuator hinge axis coincident with the swivel axis to permit the actuator to swing relative to the frame,
so that the brake shoes can move laterally simultaneously in the same general direction to follow some lateral deviation of the braking surfaces.

6. A caliper brake assembly as claimed in claim 5 in which:
    (a) the actuator hinge axis is disposed normally to and intersects the actuator axis of extension and retraction.

7. A caliper brake assembly as claimed in claim 1 in which the swivel mounting means is further characterized by:
    (a) caliper arm mounting means journalling the caliper arms and cooperating with the frame to permit relative swinging between the mounting means and the actuator about the swivel axis,
so that the brake shoes can move laterally simultaneously in the same general direction to follow some lateral deviation of the braking surfaces.

8. A caliper brake assembly as claimed in claim 7 further characterized by:
    (a) the actuator being secured to the frame, and the caliper arm mounting means being further characterized by:
    (b) arm journalling means journalling the caliper arms for pincer movement relative to each other,
    (c) connecting means cooperating with the frame and the arm journalling means to permit generally lateral movement of the arm journalling means,
so that the caliper arm mounting means can move as a unit relative to the frame.

9. A caliper brake assembly as claimed in claim 8 in which the arm journalling means is characterized by:
    (a) a journal bracket having a pair of spaced journals therein to journal the caliper arm.

10. A caliper brake assembly as claimed in claim 8 in which the connecting means is further characterized by:
    (a) connecting link means having inner and outer ends, the inner end being journalled on the frame to permit rotation of the link means about a swivel axis disposed generally parallel to the braking surfaces, the outer end cooperating with the arm journalling means to permit the arm journalling means to swing about the swivel axis.

11. A caliper brake assembly as claimed in claim 10 in which the arm journalling means is characterized by:
    (a) a journal bracket having a pair of spaced journals to journal the caliper arms, the spaced journals having axes parallel to the swivel axis,
    (b) the swivel axis is disposed between the toggle means and the caliper arm hinge axes.

12. A caliper brake assembly as claimed in claim 1 further including:
    (a) a second actuator connected to the frame and disposed parallel to the first actuator,
    (b) a connecting yoke extending between the actuators to couple the actuators together,
    (c) the toggle means extending between the connecting yoke and the caliper arms to apply force to the caliper arms when the actuators are actuated.

13. A caliper brake assembly as claimed in claim 12 further characterized by:
    (a) the connecting yoke passes between the caliper arms.

* * * * *